Figure 1:
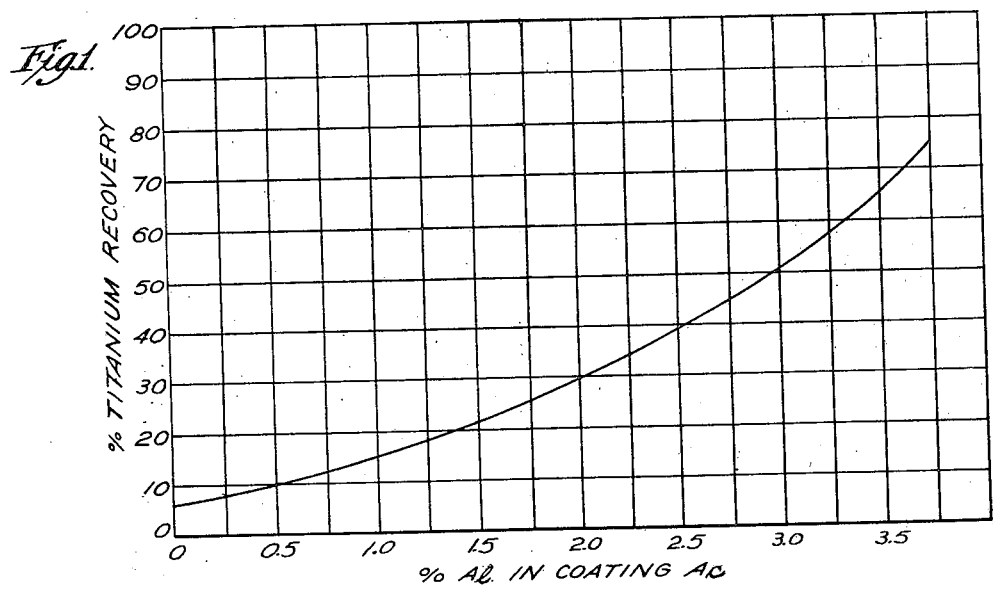

Inventors.
Royal David Thomas, Jr.
George F. Comstock
Attorneys

UNITED STATES PATENT OFFICE 2,464,836

WELDING

Royal David Thomas, Jr., Narberth, Pa., and George F. Comstock, Niagara Falls, N. Y.; said Thomas assignor to Arcos Corporation, Philadelphia, Pa., a corporation of Pennsylvania, and said Comstock assignor to National Lead Company, New York, N. Y., a corporation of New Jersey Application August 24, 1944, Serial No. 551,016

27 Claims. (Cl. 219—8)

Our invention relates to the welding of corrosion resisting chromium and chromium-nickel alloys and to a method for introducing titanium in adequate quantities into welds of these alloys.

When titanium is introduced into chromium iron alloys (especially stainless steels) containing chromium from 15% to 40% and substantially no nickel, as one example, it prevents grain growth and consequent loss in strength when the steel is heated to elevated temperatures. In the chromium-nickel steels (especially stainless steels), such as the well-known 18-8 (18% chromium, 8% nickel steels), titanium is used to stabilize the steel against intergranular corrosion. The effect of titanium for this latter purpose is to form titanium carbide with all the carbon in the steel and thus prevent the formation of any chromium carbide, which might otherwise form at the grain boundaries with local impairment of the corrosion resistance. Titanium is also used in certain special chromium-nickel steels to produce by the mechanism of precipitation hardening an improvement in the tensile strength.

Columbium has an effect identical to titanium excepting that it is only 60% as effective as titanium. Furthermore columbium is more expensive than titanium, consequently columbium alloys of equivalent properties are 10% to 15% more expensive than the titanium alloys.

Columbium has had one advantage over titanium during the past ten years in that in electric arc welding reasonable quantities of columbium (60% to 70%) could be recovered in the welds. Many attempts have been made to produce welds containing adequate titanium contents. Repeated references in the literature point to the settled belief among qualified metallurgists that titanium cannot be introduced into weld metal with any degree of efficiency. In electric arc welding according to present practice, titanium is almost completely oxidized leaving only about 10% of the original amounts deposited in the weld and thus "recovered" in the weld metal.

In order to weld alloys containing titanium, it has therefore been necessary to use electrodes containing columbium to provide the metallurgical properties in the weld metal equivalent to those found in the titanium-bearing base metal.

A prejudice has naturally developed against using two different alloys in an important alloy structure to withstand corrosion because, in the opinion of many prospective users, the different alloys, titanium in the base metal and columbium in the weld metal, may cause electrolytic corrosion.

The more expensive columbium alloy base metal was preferred because welds could be made using similar alloy. This choice seriously interfered with the sale of the less expensive but equally effective titanium alloy base metal.

Arc welding electrodes made by our method give a weld metal containing titanium in sufficient quantities to accomplish the metallurgical purpose of the titanium addition. Titanium alloys can thus be welded with an alloy having a composition similar to that of the base metal.

Stainless steel electrodes consist of a stainless steel core wire ranging in diameter from $\frac{1}{32}''$ to $\frac{3}{8}''$. This wire is covered by fluxing ingredients, which are essential for the establishment and maintenance of the arc during welding. This coating may also contain various powdered alloy ingredients, either to deoxidize and cleanse the weld metal or to introduce alloys into the weld metal which are not present in sufficient quantities in the core wire.

All of the coating ingredients which are not introduced into the weld metal as alloys form a slag over the weld. Protective coatings on core wire in the manufacture of welding electrodes have been known for a great many years.

The problem of introducing titanium into welds merely by adding finely divided titanium alloys to the coating has been tried many times in the past, with the result that insufficient titanium has been recovered. To introduce titanium in the welds by adding large quantities of titanium in the core wire is impracticable because core wires containing high percentages of titanium cannot be hot rolled and cold formed.

The Abstracts of the British Iron and Steel Institute in 1941 published a report of a Russian investigation in which it was claimed approximately .20% titanium was recovered in a weld deposit of a straight chromium steel to overcome grain growth, using ferrotitanium and ferroaluminum. The attempt to secure satisfactory deposits from welding rods coated with these alloys was unsuccessful for three reasons:

1. It produced only half of the concentration of titanium which was desired to protect against intergranular corrosion and even less than half for precipitation hardening purposes.

2. In order to introduce this amount of titanium, the use of an excessive amount of powdered alloys was required, which makes the production impractical on a commercial scale, viz:

(a) Using the extrusion process of coating electrodes, excessive powdered allows in the mix wear even the best extrusion die known to the industry to such an extent that replacements must be made too frequently for practical manufacture.

(b) Using the dipping method of manufacturing electrodes, too high a concentration of finely divided alloys cannot be suspended uniformly in the bath and the important alloys consequently settle to the bottom.

3. The alloys which were used in the coating were ferroaluminum and ferrotitanium, both containing large percentages of iron, which had the effect of diluting to a considerable extent the effective alloys introduced through the core wire.

4. Excess alloy content in the coating materially affects the arc and fluxing characteristics of the electrode as it is being used during welding. The arc becomes unstable and the slag becomes more or less fluid, making it difficult to make satisfactory welds. Furthermore, the slag may not be removed readily by ordinary hand tools which requirement that it shall be removed readily in part of most commercial specifications.

After a careful investigation of the subject matter and many tests, we have found that adequate recovery of titanium in the weld metal can be secured by the action of aluminum throughout a considerable range of percentages of titanium and aluminum and that the aluminum protects the titanium from oxidation at the temperature of the arc because the aluminum is higher in the electromotive force series of elements than is titanium; that various materials higher in this electromotive force series of elements, including all the metals of the alkali metal and alkaline earth metal chemical groups and aluminum will serve this purpose (and can be used except as recoveries of these metals in the weld may in itself be objectionable) and that in aluminum, for example, there is a definite relation between the percentage of titanium and the percentage of aluminum used. Some of the materials which would be effective otherwise are impractical for commercial purposes, because of their scarcity and high cost.

The electromotive force series of elements above is well known and accepted. It may be found in the Hand Book of Chemistry and Physics, 27th edition (1943-44), page 1368.

The metals considered by us to be practicable for use with titanium in the order of their appearance on the scale above mentioned, sometimes called the electrochemical scale, are lithium, potassium, strontium, barium, calcium, sodium, magnesium, aluminum and beryllium. Of these aluminum gives such excellent results that it has been chosen for illustration in detail. We have performed extensive tests with it.

Turning now to the use of aluminum, existing, separate alloys containing titanium and aluminum, we found, included an excessive quantity of the other alloy metals, such as iron with the aluminum, in ferroaluminum, and iron or nickel with the titanium, in ferrotitanium or nickeltitanium so that the quantities of aluminum and titanium available within the mix were insufficient to secure the required titanium recovery in the weld.

We have discovered that not only must there be an adequate quantity of titanium available for deposit, but that there must be aluminum in sufficient quantity to ensure adequate recovery of the titanium in the deposit. If attempt be made to provide both the quantity and proportions of titanium and aluminum from existing alloys, the presence of the other alloy ingredients of existing alloys makes the proportion of the metal in the mix excessive and defeats the purpose.

A special proportion of titanium and aluminum may be provided, very effective in a single alloy, with adequate titanium and sufficient aluminum, with essential and desirable other constituents and with a low enough diluent metal content for the finely divided alloy readily to be held in suspension in a unit or to be unobjectionable in an extrusion mix. The advantage over two existing alloys is very marked.

The singe alloy containing titanium and aluminum, usually along with nickel or chromium or both, permits the inclusion easily of a sufficient quantity of the titanium within the mix, very well within the proportion of finely divided metal which readily can be used in customary methods of manufacturing welding rods.

The low metal content of the mix not only makes it possible to secure complete and uniform suspension of the alloy content and thus ensures uniform coatings upon the rods but gives a considerable margin of permissible metal suspension so that additional titanium may be included beyond the percentage required for presently known metallurgical reactions.

The mixing of the metal content wholly within a single alloy secures much more nearly uniform distribution of the ingredients than by attempting to mix finely divided separate alloys.

Our discovery that the recovery of titanium is greatly influenced by the quantity of aluminum present is quite important. Assuming for the moment that there be no other metals in the alloy but aluminum and titanium, the percentage of titanium in the weld deposit increases up to the point where the aluminum is approximately two-thirds of the alloy: the actual quantity of the titanium in the alloy and therefore available for deposit recovery correspondingly reduces; but notwithstanding this fact, as seen in the figures, the amount of titanium in the deposit increases.

After a great many experiments, we learned not only that aluminum or one of the other metals of the alkali metal or alkaline earth metal group above mentioned was essential in the electrode to obtain adequate recovery of titanium in the weld metal but that the effect of aluminum on the recovery of the titanium followed an empirical law which can be closely approximated by formula as shown herein.

The alloy will, of course, not be restricted to titanium and aluminum. This is true not only because of the constituents of the ores or other sources from which the alloy is produced, causing inclusion of other metals, but because of the desirability of the presence of nickel or chromium or both. The inclusion of other metals in the mix, whether they be desirable or merely diluent, little affects the desirability of maintaining the relation between the titanium and the aluminum.

Besides testing alloys of different compositions, and different proportions of these alloys in the electrode coating, we have investigated the effect of particle size of the alloy on the experimental result. Particles which are held by a sixty mesh screen are unsatisfactory because of lack of uniformity in the coating and those which pass through a 325 mesh screen are considerably less effective.

The maximum percentage of aluminum-titanium alloy which can be added to conventional coating mixtures is about 35% or 40% if laboratory methods and special care be taken to maintain the finely divided alloy parts of the mixture in suspension but with commercial methods of manufacturing electrodes it is necessary to keep the percentage of alloy down to 30% or possibly even 25%. In addition to the titanium in the alloy and the quantity of aluminum, for example, found to be necessary to provide a high percentage of titanium in the weld, the alloys tested include various other alloy ingredients such as a nickel, chromium, and iron in considerable quantities, manganese, silicon and copper along with carbon, phosphorus, sulphur and oxygen, viewed as diluents or impurities which are not objectionable if their quantities be kept low.

Nickel was viewed as desirable for some welds, even up to more than 30% and chromium up to 10% was viewed as desirable in some welds.

Figure 2:
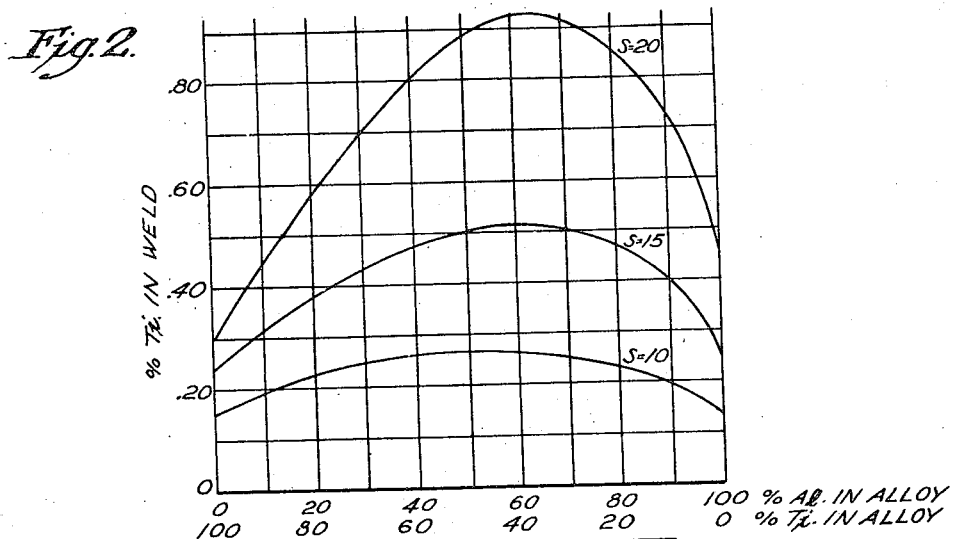

In the drawings five graphs are shown, of which two are single (Figures 1 and 3), and Figure 2 comprises a family of three graphs grouped together. The graphs will be explained as they are discussed.

The empiric law upon which we are able to base quite a close approximation to the recovery of titanium from a given aluminum-titanium mix is as follows:

$$R = 6 + 7.2 A_c + 1.4 A_c^2 + 0.4 A_c^3$$

where
$R$ = per cent recovery of titanium, whether the titanium be introduced through the core wire or the coating or both, and
$A_c$ = per cent aluminum in the coating based on 100 parts of weld metal.

The graph of this equation is shown in Figure 1, and well illustrates the benefits from use of the larger concentrations of aluminum.

From this discovery it is possible to compute the proportions of aluminum and titanium in an alloy intended for introduction into an electrode coating so that optimum titanium recovery in the weld may be secured. Obviously, the more the aluminum that can be placed in the coating, the greater the percentage of recovery of what titanium is in the coating, and, conversely, the less the loss of titanium by oxidation. Since the quantity of powdered alloy in the mix is limited, the more aluminum present the less room there is for titanium, and the less titanium is present.

In demonstration of the relations between the aluminum and titanium above, let us assume it is possible to prepare an alloy which contains aluminum and titanium only, and that such an alloy will behave in the same manner as those alloys in which the above mathematical relation was found to be true. Let us further assume that we can vary the percentage of titanium in the aluminum base alloy from 0 to 100%. By the use of the graph (Figure 1) or by the mathematical formula, we can compute the percentage of titanium in the aluminum alloy which will give the maximum amount of titanium in the weld metal.

The recovery of the titanium, in the examples, as will be seen from the graph and the equation, is a function of aluminum in the coating, which depends upon the amount of alloy that is added to the coating mix and also upon the percentage of aluminum in that alloy. This concentration of aluminum has been found to be fairly accurately computed by the following formula:

$$A_c = .0022 s Al$$

where
$s$ = the per cent alloy in the coating (based on the dry ingredients only), and
$Al$ = the per cent aluminum in the alloy.

The concentration of titanium in the coating is similarly computed by the formula:

$$T_c = .0022 s Ti$$

where $Ti$ = the percent titanium in the alloy.

The amount of titanium which is obtained in the weld metal is computed by the formula:

$$T = \frac{R(T_c + T_w)}{100}$$

where $T_w$ = the percent titanium in the core wire.

An example of computation using these formulas is as follows:

Assume
$s = 20\%$
$Al = 40\%$
$Ti = 100 - 40$ or $60\%$
$T_w = .46$
$A_c = .0022 \times 40$ or $1.76$
$T_c = .0022 \times 60$ or $2.64$ From the graph it is found that the percent recovery of titanium (corresponding to $A_c = 1.76$) is 25.5%, thus, $$T = \frac{25.5(2.64 + .46)}{100} = .79$$

This computation can be made for all reasonable values of Al and Ti. If this is done and the computed percentage of titanium in the weld metal is then plotted against the percentage of aluminum in the alloy, a family of curves can be plotted for each value of $s$. This is illustrated in Figure 2.

In the above discussion, the assumption was made for simplicity that the alloy contained titanium and aluminum only. If other elements, such as iron, chromium, nickel or silicon, which are commonly found in commercial alloys, are present the same computations can be made and a similar series of graphs prepared. We have found, for instance, that an alloy containing the following ingredients has given excellent results, the most satisfactory that we have been able to secure:

| | |
|---|---|
| Ti | 25.68 |
| Al | 47.15 |
| Ni | 6.07 |
| Cr | 6.69 |
| Si | 1.02 |
| Fe | Balance |

This alloy was designed from the computation made above, assuming that it is possible that the total titanium and aluminum in the alloy is about 73%. The graph in Figure 3 was thus prepared and the percent of titanium and aluminum was decided upon to be that value which would give the greatest percent titanium in the weld metal when 20% of the alloy was used in the coating. The maximum titanium in the weld metal is found when the alloy contains about 47% aluminum and 26% titanium. To confirm these computations, an electrode was prepared having 20% of the above alloy in the coating and the weld analyzed .525% titanium, where value compares favorably with the graph in Figure 3.

In view of the above, the main purpose of the invention is to provide a core rod with an electrode coating therefor of titanium-bearing finely divided alloy material having maximum titanium recovery in the weld.

A further purpose is to provide a core rod and electrode coating therefor having adequate titanium content and sufficient material in the coating protective of the titanium against oxidation at the temperature of the arc (such as aluminum) to provide high recovery of the titanium in the weld. The ultimate quantity of metal coating material is such as to remain in suspension for a dipping operation, or to permit application by extrusion without excessive wear upon the extrusion dies.

A further purpose is uniformly to distribute titanium and a protective metal of the alkali metal and alkaline earth metal chemical group or aluminum within a coating for an electrode core.

A further purpose is to keep low the total metal content of a mix containing titanium and a protective metal, such as aluminum, intended for electrode core rod coating and to proportion the titanium and aluminum where aluminum is used according to a relation explained by us so as to facilitate this.

A further purpose is to introduce titanium and aluminum for example in finely divided form and in usable proportions, preferably as a single alloy within an electrode flux, accompanied by other metals such as iron, nickel and chromium which may be desirable additions to the mix or which may be included by reason of the sources from which the alloy has been obtained.

A further purpose is to produce a welding electrode having a core, preferably of stainless steel, and preferably containing 0.3 to 0.6% of titanium, and a coating comprising fluxing ingredients and 10 to 40% of a powdered alloy containing between 9 and 51% (preferably between 15 and 45% and most desirably between 15 and 40%) of titanium, between 64 and 20% (more desirably between 64 and 22%, preferably between 50 and 20% and most desirably between 50 and 25%) of aluminum (or lithium, potassium, strontium, barium, calcium, sodium, magnesium or beryllium), the high percentage of titanium being preferably used with the low percentage of aluminum or the like, and vice versa, permissibly also with between 5 and 33% (preferably 5 to 10%) of nickel, from a trace to 3% of manganese, from a trace to 3% of copper, from a trace to 3% (more usually 1 to 3%) of silicon and up to 10% (more usually 5 to 10%) of chromium.

The optimum titanium and aluminum concentrations in the mix, most desirably in a single alloy, can be computed on the basis of the mathematical equation given above. If it were possible to manufacture on a commercial scale a single alloy containing only titanium and aluminum, this alloy would consist of approximately 60% to 70% aluminum and 40% to 30% titanium (the high percentage of titanium being preferably used with a low percentage of aluminum and vice versa).

The core wire for these tests was $\tfrac{1}{8}$ inch diameter, containing 20% chromium, 10% nickel and with or without .46% titanium. The various tests demonstrated that reasonable quantities of any one of a number of special alloys with chromium in the coating will produce titanium percentages in weld metal covering the range that is commonly required in chromium and chromium-nickel alloys.

An example of our invention is an electrode which comprises a stainless steel core wire of the following composition:

| | Per cent |
|---|---|
| C | .06 |
| Mn | 1.82 |
| S | .013 |
| P | .017 |
| Cr | 20.80 |
| Ni | 10.29 |
| Ti | 0.00 |

The coating for the electrode has the following dry ingredients bound with 30° Bé. sodium silicate in sufficient quantity to get a mobile, thixatropic paste which is applied by the dipping process:

| | Per cent |
|---|---|
| Calcium carbonate | 36.5 |
| Calcium fluoride | 36.0 |
| Special alloy E | 25.0 |
| Ferromanganese | 2.5 |

The analysis of the weld metal from the above electrode is as follows:

| | Per cent |
|---|---|
| C | .064 |
| Mn | 2.06 |
| Si | 1.25 |
| Cr | 20.02 |
| Ni | 10.25 |
| Ti | .43 |

The titanium content of this weld metal was designed to provide protection against intergranular corrosion, and to do so, accepted commercial specifications require titanium to be at least six times the carbon content.

Though the combining capacity between titanium and carbon requires that the amount of titanium theoretically be 4½ times the amount of carbon by weight, it is good practice to increase this relationship and in general aim at an amount of titanium about 6 times the weight of the carbon. In the present case the carbon is approximately .064%. The titanium in the weld required for stabilization is approximately .38%.

In a similar manner many other finely divided alloys were tried in varying proportions in an electrode coating. The composition of the alloys tried is shown in Table I. The results of these experiments are listed in Table II. For all these experiments a titanium bearing core wire was used.

Table I

| | Ni | Cr | Si | Ti | Al | Fe |
|---|---|---|---|---|---|---|
| Welding rod core wire | 10.62 | 18.81 | .72 | .46 | | Balance. |
| Ferro-titanium alloy | | | 3.50 | 40.60 | 8.00 | Do. |
| Nickel-aluminum alloy | 58.00 | | 2.00 | 28.00 | 10.00 | Do. |
| Ferro-aluminum alloy | | | .16 | | 49.61 | Do. |
| Special Alloy A | 6.00 | 8.00 | 2.00 | 27.00 | 44.00 | Do. |
| Special Alloy B | 33.00 | | 2.00 | 16.00 | 44.00 | Do. |
| Special Alloy C | 5.00 | 8.00 | 2.00 | 17.00 | 48.00 | Do. |
| Special Alloy D | 7.50 | 7.00 | 1.80 | 36.00 | 27.30 | Do. |
| Special Alloy E | 7.30 | 6.70 | 1.40 | 26.00 | 39.50 | Do. |
| Special Alloy F | 7.52 | 7.89 | low | 20.8 | 45.28 | Do. |
| Special Alloy G | 8.21 | 6.85 | low | 28.5 | 39.46 | Do. |
| Special Alloy H | 6.07 | 6.60 | 1.02 | 25.68 | 47.15 | Do. |

Table II

| Alloy in coating | Titanium percent in weld deposit | Percent recovery of titanium |
| --- | --- | --- |
| None, in core only | .052 | 11.00 |
| 19% FeTi | .135 | 5.50 |
| 20% FeAl | .168 | 36.50 |
| 15% NiTi | .082 | 6.00 |
| 30% NiTi | .240 | 11.50 |
| 10% FeAl plus 15% NiTi | .232 | 17.00 |
| 15% FeAl plus 10% NiTi | .281 | 26.00 |
| 20% FeAl plus 15% NiTi | .675 | 49.00 |
| 20% Alloy A with added metallic Titanium | .555 | 34.00 |
| 20% Alloy B | .292 | 25.00 |
| 20% Alloy C | .262 | 22.00 |
| 20% Alloy D | .345 | 17.00 |
| 22.5% Alloy D | .483 | 21.50 |
| 20% Alloy E | .450 | 28.00 |
| 25% Alloy F | .562 | 30.00 |
| 25% Alloy G | .769 | 41.00 |
| 25% Alloy H | .937 | 54.00 |
| 22.5% Alloy E (100 mesh) | .615 | 35.00 |
| 25% Alloy E (finer) | .600 | 32.00 |
| 30% Alloy E (finer) | .968 | 44.00 |

In a special alloy A, the addition of the pure metallic titanium powder gave reasonably satisfactory results under certain conditions, but the powder was not uniformly alloyed with the rest of the metallic particles, and was apt to give non-uniform results under production conditions.

The best results were obtained with particles which pass through a 60 mesh screen and not more than 20% of which pass through a 325 mesh screen. Finer particles show poorer percentage recoveries and coarse particles are not uniformly distributed in the coating.

The use of these special alloys permitted the preparation of electrode coatings whose dry ingredients contained only 20 to 30% of the special powdered alloy in contrast with 35 or 40% when the commercially available titanium and aluminum alloys were introduced as separate alloys. Using alloy E, 20% in the coating gave a titanium in the weld metal of .45%; with 30% alloy E a titanium content of .97% was obtained. The special alloy E, whose composition is given above, can be prepared commercially by those skilled in the art of manufacturing powdered alloys.

It will be evident that some of the alloys tested did not yield sufficient titanium in the weld for the purpose intended and some were not satisfactory generally or were capable of being used by laboratory methods only and where special attention can be given to the manufacture, but are not capable of use with normal methods of manufacture. For instance the ferro-aluminum with the nickel-titanium in one proportion shown gives adequate titanium deposit in the weld metal but is difficult to apply in manufacture and is hard to control for standard manufacturing processes.

Most of the single alloys listed which include aluminum and titanium give adequate deposit of titanium in the weld without requiring more than 30% of finely divided alloyed metal in the mix in order to obtain sufficient titanium in the weld metal for stabilization against intergranular corrosion. In the best alloys only 20 to 25% of the total mix need be of alloy character.

Though the combining capacity between titanium and carbon requires that the amount of titanium theoretically be 4½ times the amount of carbon by weight, good practice increases this relationship and in general aims at an amount of titanium about 6 times the weight of the carbon.

In the present case the carbon is approximately .064 and maximum .08. Accepting the .064% carbon the titanium in the weld required for stabilization is approximately 0.4 minimum.

Figure 3:
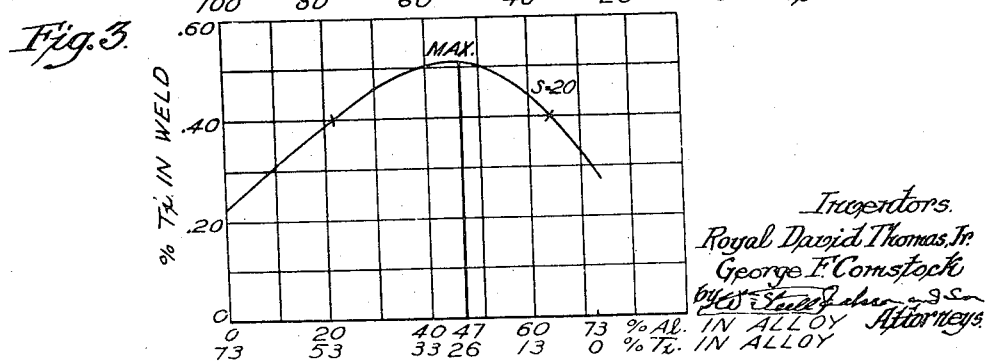

As can be seen in Figure 3 there is a wide range of titanium and aluminum contents which will give sufficient titanium in the weld metal; for instance 22% aluminum and 51% titanium will give the same percentage titanium in the weld as 64% aluminum and 9% titanium.

In both of the examples above, the weld deposit contains .40 titanium, which might be considered the minimum titanium required for stabilization of the deposit against intergranular corrosion. Any composition between these two limits would therefore yield at least this required titanium in the weld metal.

It will be evident that protection against intergranular corrosion is only one of the benefits to be had from an invention of the character of the present invention and that it will be used in connection with precipitation hardening in chrome nickel alloys and grain refining in straight chromium alloys.

It will be evident that the various metals indicated in the alkali metal and alkaline earth metal chemical groups as well as the aluminum will vary in their protective effect in proportion to their atomic weights and will each have a range of maximum usefulness defined by a curve corresponding generally to the curves shown in Figures 1, 2 and 3 and capable of representation in approximate formulae, so that the treatment to secure individual results can be outlined or forecasted suitably just as in the case of the aluminum which has been discussed at length.

It will be evident that the alloy made can be an alloy wholly or largely made up of titanium and the metal which is more oxidizable than the titanium at arc temperatures and which therefore at these arc temperatures acts as a protecting or reducing agent for the titanium.

These alloys can be formed by electric induction furnaces where the elements can be melted and combined in a vacuum atmosphere or a nitrogen or other inert atmosphere. One furnace capable of such use either under vacuum or in inert atmospheres is known as the "vacuum schmelze" furnace.

Where the finely divided alloy is to be applied in a water dispersion it should not contain enough sodium, potassium, lithium, strontium, beryllium or calcium to react with the water during the time of exposure.

The various reducing agents which have been discussed and which are protective of the titanium at arc temperatures can be included in alloy material forming a coating upon an electrode core which core itself contains a protective (reducing) metal as an alloy ingredient and this protecting metal, when one is used in the core, may be the same reducing metal as used in the coating or a different reducing metal.

On the other hand the core may wholly lack protective or reducing function, leaving all of the reducing functions for the coating. The coating as before should be mixed with a normal flux coating of which one example already has been given herein.

The reducing agent need not be confined to a single one of the metals discussed in the alkali metal and alkaline earth metal chemical groups but can be a single alloy or a multiple alloy or multiple alloys, including two or more of these metals. It is most desirable as a single alloy whether it be an alloy of titanium and one reducing agent or with a plurality of reducing agents.

If the metal or metals to be applied in the arc with titanium be all contained in a single alloy they can be mixed much more uniformly in the making of the alloy, and more easily than if they be contained in a plurality of alloys which must be mixed after they are finely divided. Moreover the selection of the metal or metals which are to be used with titanium may be made with a view to control of melting point of the alloy whether because of a desirable melting point in manufacture or from the use of the metal or metals in the arc.

In view of our invention and disclosure variations and modifications to meet individual whim or particular need will doubtless become evident to others skilled in the art, to obtain all or part of the benefits of our invention without copying the structure shown, and we therefore claim all such in so far as they fall within the reasonable spirit and scope of our claims.

Having thus described our invention what we claim as new and desire to secure by Letters Patent is:

1. A stainless steel welding rod having a titanium-bearing coating comprising from 10 to 40 percent by weight of a powdered alloy containing between 15 and 45 percent of titanium, between 20 and 50 percent of aluminum, between 5 and 33 percent of nickel and up to 3 percent each of manganese, copper, silicon, the balance being chiefly iron.

2. A stainless steel welding rod having a titanium-bearing coating comprising from 10 to 40 percent by weight of a powdered alloy containing between 15 and 45 percent of titanium, between 20 and 50 percent of aluminum, between 5 and 33 percent of nickel, up to 10 percent of chromium, and up to 3 percent each of manganese, copper and silicon, the balance being chiefly iron.

3. An alloy for inclusion in a welding rod coating comprising between 15 and 45 percent of titanium, between 20 and 50 percent of aluminum, between 5 and 33 percent of nickel, and from traces to 3 percent each of manganese, copper and silicon, the balance being chiefly iron.

4. An alloy for inclusion in a welding rod coating comprising between 15 and 45 percent of titanium, between 20 and 50 percent of aluminum, between 5 and 33 percent of nickel, and from traces to 10 percent of chromium, the balance being chiefly iron.

5. A stainless steel welding rod having a titanium-bearing coating comprising from 10 to 40 percent by weight of a powdered alloy containing between 15 and 40 percent of titanium, between 25 and 50 percent of aluminum, between 5 and 10 percent of nickel, between 5 and 10 percent of chromium, between 1 and 3 percent of silicon, and up to 3 percent each of manganese and copper, the balance being chiefly iron.

6. An alloy for inclusion in welding rod coating comprising between 15 and 40 percent of titanium, between 25 and 50 percent of aluminum, between 5 and 10 percent of nickel, between 5 and 10 percent of chromium, between 1 and 3 percent of silicon, and from traces to 3 percent each of manganese and copper, the balance being chiefly iron.

7. The method of producing a stainless steel weld deposit stabilized against intergranular corrosion by the inclusion therein of titanium in excess of 0.3 percent, said method comprising coating a stainless steel core wire with a coating comprising from 10 to 40 percent by weight of a powdered alloy containing between 15 and 45 percent of titanium, between 20 and 50 percent of aluminum, between 5 and 33 percent of nickel, and up to 3 percent each of silicon, manganese and copper, the balance being chiefly iron, and producing a weld deposit by employing such coated wire as an electrode in electric arc welding.

8. The method of producing a stainless steel weld deposit stabilized against intergranular corrosion by the inclusion therein of titanium in excess of 0.3 percent, said method comprising coating a stainless steel core wire with a coating comprising from 10 to 40 percent by weight of a powdered alloy containing between 15 and 45 percent of titanium, between 20 and 50 percent of aluminum, between 5 and 33 percent of nickel, up to 10 percent of chromium, and up to 3% each of silicon, manganese and copper, the balance being chiefly iron, and producing a weld deposit by employing such coated wire as an electrode in electric arc welding.

9. A stainless steel welding rod containing between 0.3 and 0.6 percent of titanium and having a coating comprising from 10 to 40 percent by weight of a powdered alloy containing between 15 and 45 percent of titanium, between 20 and 50 percent of aluminum, between 5 and 33 percent of nickel, and up to 3 percent each of copper, manganese and silicon, the balance being chiefly iron.

10. A stainless steel welding rod having a titanium-bearing coating comprising from 10 to 40 percent by weight of a powdered alloy containing between 15 and 45 percent of titanium, between 20 and 50 percent of aluminum, up to 10 percent of chromium, and up to 3 percent each of manganese, copper and silicon, the balance being chiefly iron.

11. A welding rod coating comprising a flux and from 10 to 40 percent by weight of a powdered alloy comprising between 15 and 45 percent of titanium, between 20 and 50 percent of aluminum, the higher content of titanium being present with a lower content of aluminum and vice versa, from traces to 10 percent of chromium, and from traces to 3 percent each of manganese, copper and silicon, the balance being chiefly iron.

12. A mix for use in coating electrode cores to make finished welding electrodes, comprising a flux and a powdered alloy containing titanium between the limits of 9 per cent and 51 per cent and aluminum between the ranges of 64 percent and 22 percent, the higher content of titanium being present with a lower content of aluminum and vice versa.

13. An electrode core wire having a coating whose alloy content comprises a range of titanium from 9 percent to 51 percent and an aluminum content within the range of 64 percent to 22 percent and nickel not more than 33 percent, the remainder of the alloy content being largely iron.

14. An electrode core wire having a coating whose alloy content comprises a range of titanium from 9 to 51% and an aluminum content within the range of 64 to 22% and chromium not more than 10%, the remainder of the alloy content being largely iron.

15. An electrode core wire having a coating whose alloy content comprises a range of titanium from 9 to 51% and an aluminum content within the range of 64 to 22%, nickel not more than 33% and chromium not more than 10%, the remainder of the alloy content being largely iron.

16. A stainless steel welding rod having a titanium-bearing coating comprising from 10 to 40 percent by weight of a powdered alloy containing between 9 and 51 percent of titanium, between 64 and 22 percent of aluminum, between 5 and 33 percent of nickel, up to 10 percent of chromium, and up to 3 percent each of manganese, copper and silicon, the balance being chiefly iron.

17. An alloy for coating a welding rod core having a titanium-bearing coating comprising from 10 to 40 percent by weight of a powdered alloy containing between 9 and 51 percent of titanium, between 64 and 22 percent of aluminum, between 5 and 33 percent of nickel, and up to 3 percent each of manganese, copper and silicon, the balance being chiefly iron.

18. An alloy for use in coating welding rod cores comprising between 9 and 51 percent of titanium, between 64 and 22 percent of aluminum, between 5 and 33 percent of nickel, and up to 10 percent of chromium, between 5 and 33 percent of nickel, and up to 3 percent each of manganese, copper and silicon, the balance being chiefly iron.

19. An alloy for use in coating welding rod cores comprising between 9 and 51 percent of titanium, between 64 and 22 percent of aluminum, between 5 and 33 percent of nickel, and up to 10 percent of chromium, the balance being chiefly iron.

20. A mix for dipping electrodes, containing on a dry basis by weight a flux and 10 to 40 percent of an alloy containing titanium 9 to 51 percent and aluminum 65 to 22 percent and silicon and iron in which the coarser particles when dry will all pass through a sixty mesh screen.

21. A stainless steel welding rod core and a coating for the core containing a flux and 10 to 40 percent of an alloy of 15 to 45 percent of titanium with 20 to 50 percent of a metal of the class which consists of lithium, potassium, strontium, barium, calcium, sodium, magnesium, aluminum and beryllium.

22. A stainless steel welding rod core and a coating for the core containing a flux and 10 to 40 percent of an alloy of 15 to 45 percent of titanium with 20 to 50 percent of a metal of the class which consists of lithium, potassium, strontium, barium, calcium, sodium, magnesium, aluminum and beryllium and having one of these metals alloyed within the rod core.

23. A stainless steel welding rod electrode core and a coating for the core containing a flux and 10 to 40 percent of an alloy of 15 to 45 percent of titanium with 20 to 50 percent of a metal higher in the electromotive force series than is titanium.

24. The method of making titanium available in welding electrodes which comprises coating a welding rod with a finely divided alloy composed of titanium and a metal higher in the electromotive force series of elements than is titanium in sufficient quantity so that by its higher capacity for oxidation said metal reduces oxidation of the titanium in the arc.

25. The method of making titanium available in stainless steel welding electrodes which comprises using from 20 to 50 percent of a metal of the class which consists of lithium, potassium, strontium, barium, calcium, sodium, magnesium, aluminum and beryllium as a protection for the titanium against oxidation at the temperature of the arc and in applying the said metal along with the titanium as a single alloy in finely divided form as a coating upon a stainless steel welding core rod.

26. Material for inclusion in the coating of a welding rod for producing stainless steel weld deposits stabilized against inter-granular corrosion and wherein the weld to be produced will contain at least four and one-half times as much titanium as carbon comprising as essential ingredients titanium, aluminum and nickel, the titanium constituting 15% to 45%, the aluminum 20% to 50%, and the nickel 5% to 33% of the material, traces to 3% each of manganese, copper and silicon, the balance being chiefly iron.

27. Material for inclusion in the coating of a welding rod for producing stainless steel weld deposits stabilized against intergranular corrosion and wherein the weld to be produced will contain at least four and one-half times as much titanium as carbon comprising as essential ingredients titanium, aluminum and nickel, the titanium constituting 15% to 45%, the aluminum 20% to 50%, and the nickel 5% to 33% of the material, the balance being chiefly iron.

ROYAL DAVID THOMAS, Jr.
GEORGE F. COMSTOCK.

REFERENCES CITED

The following references are of record in the file of this patent:

UNITED STATES PATENTS

| Number | Name | Date |
| --- | --- | --- |
| 1,241,899 | Armstrong | Oct. 2, 1917 |
| 1,599,056 | Lloyd et al. | Sept. 7, 1926 |
| 1,679,002 | Pilling et al. | July 31, 1928 |
| 1,679,003 | Pilling et al. | July 31, 1928 |
| 1,926,090 | Frichey et al. | Sept. 12, 1933 |
| 1,942,364 | Rood | Jan. 2, 1934 |
| 2,266,745 | Efimoff | Dec. 23, 1941 |
| 2,303,746 | Kihlgren et al. | Dec. 1, 1942 |

OTHER REFERENCES

"Eisen-und Stahllegierungen," Grützner, Berlin 1935, pp. 184–5.